May 1, 1951 J. O. GRAVES 2,551,433
EDUCATIONAL APPARATUS FOR TEACHING
OBSTETRICS AND MIDWIFERY
Filed Dec. 27, 1949 3 Sheets-Sheet 1

INVENTOR.
Julia O. Graves
BY
Mason, Fenwick & Lawrence
ATTORNEYS

May 1, 1951 J. O. GRAVES 2,551,433
EDUCATIONAL APPARATUS FOR TEACHING
OBSTETRICS AND MIDWIFERY
Filed Dec. 27, 1949 3 Sheets-Sheet 2

INVENTOR.
Julia O. Graves
BY
Mason, Fenwick & Lawrence
ATTORNEYS

May 1, 1951  J. O. GRAVES  2,551,433
EDUCATIONAL APPARATUS FOR TEACHING
OBSTETRICS AND MIDWIFERY

Filed Dec. 27, 1949  3 Sheets-Sheet 3

INVENTOR.
Julia O. Graves
BY
Mason, Fenwick & Lawrence
ATTORNEYS

Patented May 1, 1951

2,551,433

UNITED STATES PATENT OFFICE 2,551,433

EDUCATIONAL APPARATUS FOR TEACHING OBSTETRICS AND MIDWIFERY

Julia O. Graves, Savannah, Ga.

Application December 27, 1949, Serial No. 135,156

5 Claims. (Cl. 35—17)

This invention relates to educational apparatus for teaching, by means of demonstration, the approved practice of midwifery.

There are many sections of the country in which modern knowledge and procedure in the practice of obstetrics is not wide spread, but in which, on the contrary, the majority of child births are entrusted to midwives whose training is limited to that acquired through experience. It is upon the supposition that the older the midwife the more experience she has, that the more elderly midwives have gained a prestige over the younger members of the group, so that they bring to the childbed traditional practices which do not make sense, and some of which are positively detrimental to the welfare of mother and child.

This practice is reflected in the statistics which show that in those places where the practice of obstetrics is for the most part left to unlicensed midwives with no standard of qualifications, the mortality rate of mothers, as well as new born babies, is much greater than in the more favored sections where hospitalization and scientific technique are the customary resort.

State agencies endeavoring to raise the standard of obstetrical qualifications are confronted with the alternative of refusing to license the great bulk of midwives, or of offering them as a condition to eligibility for a license, a short course in the only practical method of training that is adapted to their very limited educational status, that is, by a system of demonstration. The first alternative is impractical, since there are not enough qualified nurses to go around, and in the hinterlands where the need for improved knowledge and methods is greatest, the people would resort to the midwives, licensed or not.

The present invention provides the mechanical adjuncts by means of which a qualified instructor can demonstrate to a class of limited literacy, in an interesting and easily understood manner, the phenomena of parturition and the procedures required in a normal delivery, as well as the more common exigencies of birth encountered sooner or later in the experience of the midwife.

The invention comprises these elements, employed singly and in combination:

(a) The mother manikin.
(b) The fetus doll.
(c) The placenta, per se, or in combination with the fetus.

One of the objects of the invention is to provide a mother manikin substantially full size, having an abdominal cavity open at the front, selectively closable by one of three ventral covers of different degrees of convexity, copied from nature, representing the shape at the three trimestral periods of pregnancy, by means of which the midwife can learn to judge by observation how far the gestation period has run, in the examination of her patients.

Another object of the invention is to provide a mother manikin as described, in which the abdominal cavity is sufficiently capacious to enable the instructor using a full size flexible jointed fetus doll to demonstrate the several positions which the fetus may occupy in the abdomen at the time of delivery.

Still another object of the invention is to provide the mother manikin with a flexible and expansible vagina forming a wall of the abdominal cavity, sufficiently large to permit the fetus doll to pass through it.

Another object of the invention is to make the mother manikin with jointed head and limbs so that various positions assumed by the mother can be demonstrated, such as the knee-chest attitude, useful in retarding delivery.

A further object of the invention is to provide a full size fetus doll with the various landmarks such as ears, eyes, nose, soft fontanelle, lips, etc., so that the student midwife can explore with her hand through the vaginal opening, to where the fetus doll is held from within the abdominal cavity by the instructor, to enable her to identify the several landmarks by touch alone.

Another object of the invention is to provide the fetus doll with a flexible lower lip and a cavity behind the lip so that in demonstrating a podial version the student can actually practice the expedient of pressing in the lower lip with the finger and then downward on the lower jaw to tilt the chin inward and safeguard the baby against being choked.

A still further object of the invention is to provide a placenta simulating as nearly as possible the natural placenta both on the maternal and fetal sides, having the chorion and amnion membranes with which the fetus doll may be enclosed by drawing the edges of the membranes together, the placenta being expansible into flat form to make it possible to demonstrate the manner of examining the cotyledon to determine whether a detached fragment may yet remain in the uterus.

Another object of the invention is to provide the placenta with an umbilical cord emanating from the middle of the fetal surface and joined to the fetal doll by a severable joint adjacent the doll by means of which the severance of the cord at delivery and the appurtenant treatment thereof may be shown.

Other objects of the invention will appear as the following description of a preferred and practical embodiment thereof proceeds.

In the drawings throughout the several figures of which the same reference characters have been used to denote identical parts:

Figure 1:
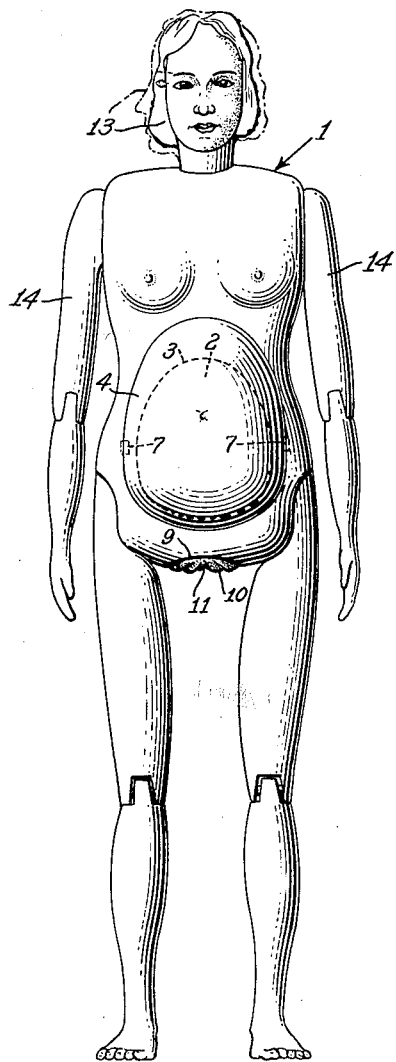
Figure 1 is a front elevation of the mother manikin.
Figure 2:
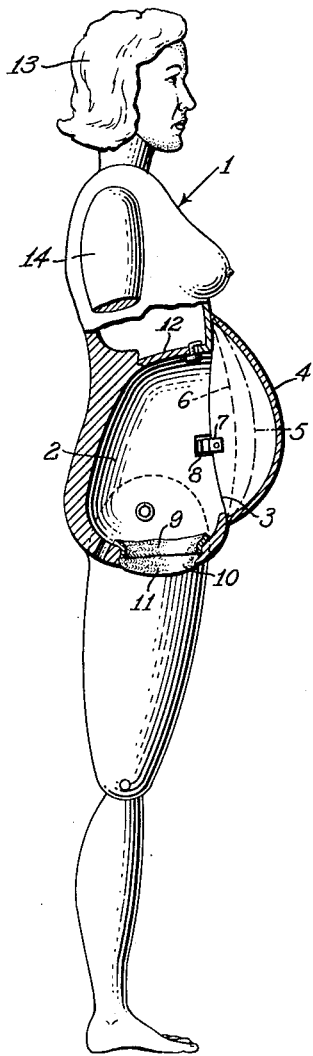
Figure 2 is a side elevation, partly in section.

Referring now in detail to the several figures, the numeral 1 represents the mother manikin as a whole, which preferably has the size and general likeness of an actual woman, the head, arms and legs being preferably jointed, as shown, so that the manikin can be made to assume various positions of which the human body is capable. The manikin may be made of any suitable material such as papier-mâché, plastic, etc., and may be covered with a skin coat of latex or other material simulating skin in appearance and to the touch.

The manikin 1 is provided with an abdominal cavity 2, opening in the ventral surface of the body, and sufficiently capacious to contain a full sized fetus doll, with enough room to permit the instructor to move the fetus doll about within the abdominal cavity to demonstrate various "lays." The ventral opening 3 is provided with three closures 4, 5, and 6, adapted to be selectively employed to show the characteristic shape of the abdominal wall at the end of each of the trimesters of the gestation period, useful in cultivating the ability of the student midwife to determine approximately the stage of pregnancy attained by her patients. The contour of these closures is a faithful replica of the shape of an actual abdomen at the stated periods of pregnancy. The interfacial edges of the ventral opening 3 and the respective closures 4, 5 and 6 is planiform, and any suitable means for detachably securing the closures is within the purview of the invention. The illustrated embodiment shows spring tongues 7, riveted one on each side of the closure, which snap into corresponding recesses 8 in the inner wall of the abdominal cavity. The closure may be removed by grasping it on opposite sides and pulling it away from the body against the resistance of the spring tongues.

The lower part of the wall of the abdominal cavity is provided with an opening 9, of such size as to let the head of the fetus doll pass through it, this opening being covered by a flexible yielding membrane 10 of suitable material, such as rubber, formed with a vaginal opening 11 of normal size, capable of stretching to permit the passage of the fetus doll. The vagina is preferably made as life-like as possible, and the external genitalia may be represented.

The fetus doll 17 having been placed in the abdominal cavity, the instructor by pushing it step by step against the vaginal membrane from the inside, can demonstrate the progress of normal, as well as unusual deliveries, and teach the student how to manage the same.

The head 13 of the mother manikin is turnable, the arms 14 jointed at shoulders and elbow, and the legs at hip and knee so that the mother manikin can be placed in any of the positions which it is advantageous for the patient to assume incident to delivery. The upper part of the abdominal cavity has a removable door 12, through which access can be had to the joint mechanism (not shown) of the head and arms, for tightening the same when required.

Figure 3:
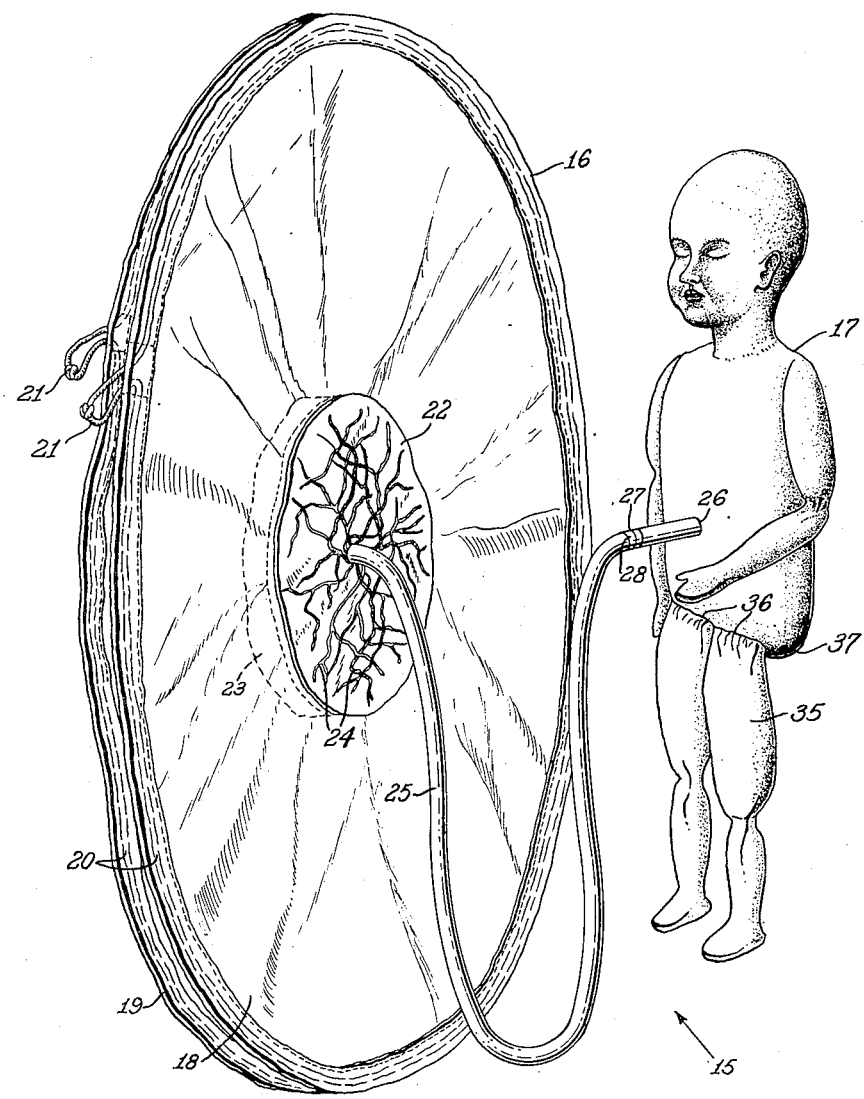
Figure 3 is a perspective view showing the fetus doll and the fetal side of the placenta.
Figure 4:
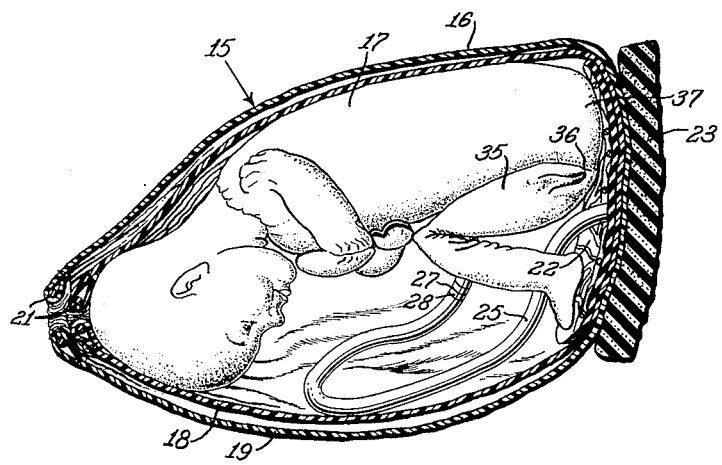
Figure 4 is a longitudinal section through the placenta, showing it in enveloping relation to the fetus doll.
Figure 5:
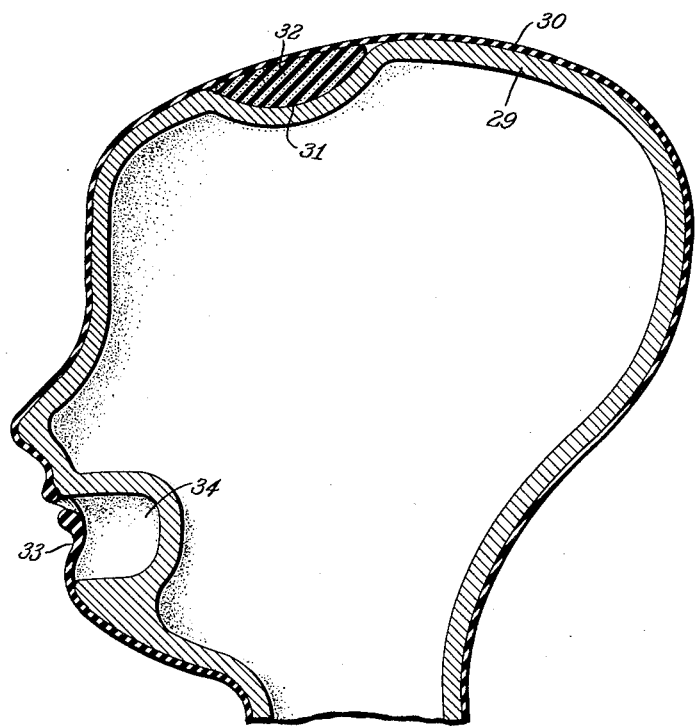
Figure 5 is a side view in section of the head portion of the fetus doll, showing particularly the cavity behind the flexible lower lip.

Referring now to the fetal unit 15, shown in Figures 3 and 4, this comprises the placenta 16 and fetus doll 17, the latter being shown enveloped in the placenta in Figure 4. The placenta comprises two congruent translucent sheets 18 and 19 of "pliofilm" or other suitable plastic, circular in form when spread out, and each having a circumferential tubular hem 20 therearound, through which a drawstring 21 runs, by means of which the sheets can be drawn together in the form of a pouch enclosing the fetus doll.

The sheet 18 represents the amnion membrane which comes next to the fetus, and sheet 19 is the chorion membrane which lies next to the mother. In the middle of the amnion on the inner side and in the middle of the chorion on the outer side are the congruent circular patches 22 and 23, the latter being of sponge rubber or other similar material representing the cotyledonary surface, and the patch 23 which may be made of rubber or the like, representing the center of the amnion with its maze of arteries and veins delineated in the form of red and blue filaments 24, such as yarn.

The umbilical cord 25 emanates from the center of the chorion membrane and is joined to the belly of the fetus doll, as shown at 26. At a distance of two or three inches from the fetus doll the umbilical cord is divided, as shown at 27, the ends being detachably connected by a snap fastener 28, the elements of which are secured to the respective ends. The umbilical cord is preferably transparent or translucent to make visible red and blue cords that run through it, representing arteries and veins.

Ordinarily when demonstrating the progress of labor, the instructor will not want the fetus doll enveloped in the placenta, for it may be awkward for him to manipulate the fetus doll through the surrounding placenta. The detachable connection at 25 is a convenient means for separating the fetus doll from the placenta when it is desired to use either per se, and it is of course useful in demonstrating the zone which is to be tied off in separating the infant from the afterbirth.

Referring to Figure 4, the drawstring 21 of the amnion envelop 18 may be drawn sufficiently tight to permit a syringe to be inserted through the constricted mouth and the placenta filled with water to simulate the amniotic fluid. In illustrating the final stages of delivery, the instructor may, with the enclosed fetus doll positioned within the body cavity of the mother manikin, release the drawstrings and as he pushes the head through the vagina, cause the placenta to evert so that it may be made to issue in normal fashion following the emergence of the fetus doll, and after the latter has been detached from the section of the umbilicus connected to the placenta.

The placenta in the spread position shown in Figure 3, is particularly important in demonstrating the nature of the examination to which the cotyledonary area must be subjected to determine whether there is evidence of a fragment detached, which may remain in the uterus and require the services of a doctor.

Referring now to the fetus doll 17, this may have a separate head and body, the head preferably having a rigid molded shell 29, shown in Figure 4, covered by a soft rubber-like skin material 30. The shell of the head is formed with a recess 31 in the region of the fontanelle, which receives a suitable cushion 32 of rubber or like material, the upper surface of which is flush with the general contour of the skull and is overlain by the skin material 30. Thus, the fontanelle is not visible but can be detected by pressing the skin 30 with the fingers.

Back of the lower lip 33 the shell 29 is formed with a cavity 34, over which the lower lip is stretched, the lip being part of the skin material 30, and therefore flexible. The eyes, nose, mouth, ears and fontanelle constitute land marks which the student midwife can learn to identify by exploring with the hand through the vagina while the instructor holds the head in different positions on the inside.

The depressible lower lip is an important feature of the invention in teaching the management of the infant's head in a podalic version, in which the head must be turned and the chin brought close to the chest to avoid the risk of choking. The instructor having pushed the legs and body of the fetus doll through the vagina from the inside of the body cavity, the student explores with the fingers through the vaginal opening from the outside, identifies the mouth, and puts the finger in the mouth by pressing against the lower lip, then presses against the lower jaw with the finger, tilting the head in a forward direction. The exploration by the hand of the landmarks of the head may be made quite realistic if the head has been previously coated with a suitable paste resembling in constituency the vernix caseosa.

The head is flexibly joined to the body in such a manner as to move relatively thereto in a front to back direction, and the arms and legs are flexibly jointed at shoulder and elbow, and hip and knee, respectively. The legs 35 are joined to the lower portion of the trunk forwardly of the medial longitudinal transverse plane of the trunk, as shown at 36, so as to define prominent buttocks 37 to the rear of the legs, a feature of importance in folding the fetus doll into prenatal position in the placenta, and for other purposes. The body, arms and legs of the fetus doll are preferably covered with a soft flexible waterproof coating, such as latex or similar material resembling skin.

Reference is made to copending application Serial No. 190,858, filed by applicant on October 18, 1950, which discloses the mother manikin 1.

While I have in the above description disclosed what I believe to be a preferred and practical embodiment of my invention, it will be understood by those skilled in the art that the specific details of construction and shape of the parts may be altered without departing from the spirit and scope of the invention.

What I claim as my invention is:

1. In an educational device for teaching midwifery in combination, a doll simulating the fetus having flexibly joined head and limbs adapting it to be folded into a prenatal position, a cord simulating the umbilical cord connected at one end to said doll, and an envelope simulating a placenta connected to the opposite end of said cord adapted to be enfolded about the folded doll, said envelope having contractable edges, and means for drawing said edges together into a closed mouth adjacent the head of said doll.

2. In an educational device for teaching midwifery as claimed in claim 1, said envelope on its outer side having a circumscribed area of material resembling the cotyledon axially opposite the mouth of said envelope when the latter is in enfolded position with respect to said doll.

3. In an educational device for teaching midwifery, means simulating a placenta including a substantially flat disk-like sheet adapted to be enfolded about a simulated fetus to enclose the same, having a contractable edge, means for drawing said edge together into a closed mouth, said sheet having a circumscribed area of material simulating the cotyledon on the outside of said sheet axially opposite said mouth.

4. In an educational device for teaching midwifery, means simulating a placenta including an envelope formed of inner and outer substantially flat congruent disk-like sheets representing the amnion and chorion membranes, secured together at the middle region and having free marginal portions, said sheets being adapted to be enfolded about a simulated fetus to enclose the same, means for bringing the edges of said sheets together to form a closed mouth, said outer sheet having on its outer side a circumscribed area of material in the middle region resembling the cotyledon, a cord simulating the umbilical cord connected to the inner side of the inner sheet in the middle, said inner sheet having an area surrounding said cord having the outlines of veins and arteries.

5. In an educational device for teaching midwifery, a doll simulating a fetus, having a body, and a head and limbs flexibly joined to said body to enable said doll to be folded into prenatal attitude, said head including a rigid shell formed with a mouth cavity, and flexible skin material covering said shell including said cavity, said skin material having a mouth slit over said cavity defining a lower lip portion depressible by the finger to admit the finger to said cavity.

JULIA O. GRAVES.

REFERENCES CITED

The following references are of record in the file of this patent:

UNITED STATES PATENTS

| Number | Name | Date |
| --- | --- | --- |
| 88,432 | Aylworth | Mar. 30, 1869 |
| 451,675 | Klautsch | May 5, 1891 |
| 1,384,731 | Richards | July 12, 1921 |
| 2,089,376 | Jacobson | Aug. 10, 1937 |
| 2,127,774 | Jacobs | Aug. 23, 1938 |
| 2,203,891 | Burtenshaw | June 11, 1940 |
| 2,237,751 | Bunin | April 8, 1941 |

OTHER REFERENCES

"Chase Hospital Doll and Baby," catalogue issued by the M. J. Chase Co. of Pawtucket, Rhode Island, Oct. 18, 1932, page 7 (illustration).

Catalogue No. 103 of the "Clay-Adams" Co., N. Y., Oct. 22, 1947, pages 98, 99 and 100.